United States Patent
Duttweiler et al.

[11] Patent Number: 5,818,514
[45] Date of Patent: Oct. 6, 1998

[54] VIDEO CONFERENCING SYSTEM AND METHOD FOR PROVIDING ENHANCED INTERACTIVE COMMUNICATION

[75] Inventors: Donald Lars Duttweiler, Rumson; Barin Geoffry Haskell, Tinton Falls, both of N.J.

[73] Assignee: Lucent Technologies Inc., Murray Hill, N.J.

[21] Appl. No.: 347,979

[22] Filed: Dec. 1, 1994

[51] Int. Cl.$^6$ ....................................................... H04N 7/15
[52] U.S. Cl. ............................................... 348/15; 348/14
[58] Field of Search ................................. 348/17, 18, 19, 348/15, 14, 16; 379/96, 202, 204, 205, 93.17, 93.21

[56] References Cited

U.S. PATENT DOCUMENTS

| | | | |
|---|---|---|---|
| 4,531,024 | 7/1985 | Colton et al. | 348/15 |
| 4,805,205 | 2/1989 | Faye | 379/96 |
| 5,231,492 | 7/1993 | Dangi et al. | 348/17 |
| 5,491,743 | 2/1996 | Shiio et al. | 348/15 |
| 5,512,939 | 4/1996 | Zhou | 348/17 |

Primary Examiner—Stella Woo

[57] ABSTRACT

A system and method for enhancing interactive communication between video conferencing devices of the type in which a delay is inserted into the audio transmission path to provide lip synchronization of the image and speech of the respective users thereof. Each video conferencing device includes a display device for displaying images of at least one communicating party and a speech communicating system for communicating with the communicating party. In accordance with one embodiment of the invention, a speech detecting circuit detects an utterance by a first user of a first video conferencing apparatus. An audible or visual indication is provided to at least a second user of a second video conferencing apparatus before the utterance is reproduced. As a result, the potential for simultaneous speaking by two or more users is substantially reduced. In an alternate embodiment, the amount of delay introduced into the audio signal transmission path is adjusted in accordance with the mode of operation of the video conferencing devices. An audio signal processing system detects, over predetermined intervals, whether or not an interactive conversation between two or more users is in progress. If an interactive conversation is not detected, lip synchronization proceeds in a conventional manner by introducing a predetermined delay into the audio path. If an interactive conversation is detected, the amount of audio delay inserted is minimized until there is a return to the lecture mode of operation.

13 Claims, 3 Drawing Sheets

VIDEO CONFERENCING SYSTEM AND METHOD FOR PROVIDING ENHANCED INTERACTIVE COMMUNICATION

BACKGROUND OF THE INVENTION

1. Field of the Invention

This invention relates generally to video telecommunication systems and, more particularly, to a system and method for providing enhanced interactive communication between multiple users thereof.

2. Description of the Related Art

The video encoders and decoders currently deployed in video conferencing equipment to reduce the required transmission bit rate generally add substantial transmission delay. Depending upon the coding algorithm employed, one-way delays may be between approximately 80 and 350 ms. Although sophisticated audio encoding and decoding also introduces some delay, that delay is usually no more than a few tens of milliseconds and, hence, substantially less than the corresponding video delay. Accordingly, additional delay is typically inserted into the audio transmission path in order to keep the video and audio in synchronization.

Two conventional video conferencing units indicated generally at 10 and 12 are illustrated in FIG. 1. As will be readily appreciated by those skilled in the art, systems 10 and 12 may be employed to establish an interactive dialogue between two persons or to allow a number of persons to receive audio and video from one or more remote speakers in accordance with a non-interactive or limited interactivity lecture mode. During operation in the lecture mode, for example, sound and image signals which represent the voice and image of user A are sent to a receiver 14 and a display 16 of apparatus 12, respectively. Where operation in the lecture mode is prevalent, the sound and image signals which represent the voice and image of user A may be sent to a large number of conferencing units, with each such unit serving a respective user/listener. During operation in an interactive mode, which illustratively may facilitate a two-way exchange between users A and B, sound and image signals representing the voice and image of user B are sent to a receiver 18 and display 25 of apparatus 10.

When video conferencing equipment such as the units 10 and 12 is being used in the lecture mode, with most of the audio originating at only one location, the "lip sync" achieved by inserting delay into the sound or audio signal transmission path is highly desirable. During interactive conversation, however, conversational dynamics are often disrupted. For example, if A and B were to start talking at about the same time, neither would be aware of the simultaneous start until the other's speech was heard one transmission delay later. They might then both stop speaking, not becoming aware of the simultaneous stop until after another transmission delay later. The resulting speak and pause cycles may continue for extended periods during a conversation, eventually becoming annoying and disruptive.

SUMMARY OF THE INVENTION

In accordance with the present invention, the annoying disruptions caused by the aforementioned simultaneous speaker problem associated with prior art video conferencing systems are avoided by enhancing interactive communication between respective video conferencing devices. Each video conferencing device includes a display device for displaying images of at least one communicated party and a speech communicating system for communicating with the communicated party.

In accordance with one aspect of the invention, a speech detecting circuit detects an utterance by a first user of a first video conferencing apparatus. An audible or visual indication is provided to at least a second user of a second video conferencing apparatus before the utterance is reproduced by the second video conferencing apparatus. As a result, the second user is aware that the first user has begun speaking and can refrain from speaking. Accordingly, the potential for simultaneous speaking by two or more users is substantially reduced.

In accordance with another aspect of the present invention, the amount of delay introduced into the audio signal transmission path is adjusted in accordance with the mode of operation of the video conferencing devices. An audio signal processing system detects, over predetermined intervals, whether or not an interactive conversation between two or more users is in progress. If an interactive conversation is not detected, lip synchronization proceeds in a conventional manner by introducing appropriate delay into the audio path. If an interactive conversation is detected, on the other hand, the amount of audio delay that is inserted is minimized until a change back to the lecture mode of operation is detected or otherwise initiated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

For a better understanding of the invention, its operating advantages, and specific object attained by its use, reference should be had to the descriptive matter in which there is described preferred embodiments of the invention and to the accompanying drawings, in which.

DETAILED DESCRIPTION OF THE PRESENTLY PREFERRED EMBODIMENTS

Figure 2:
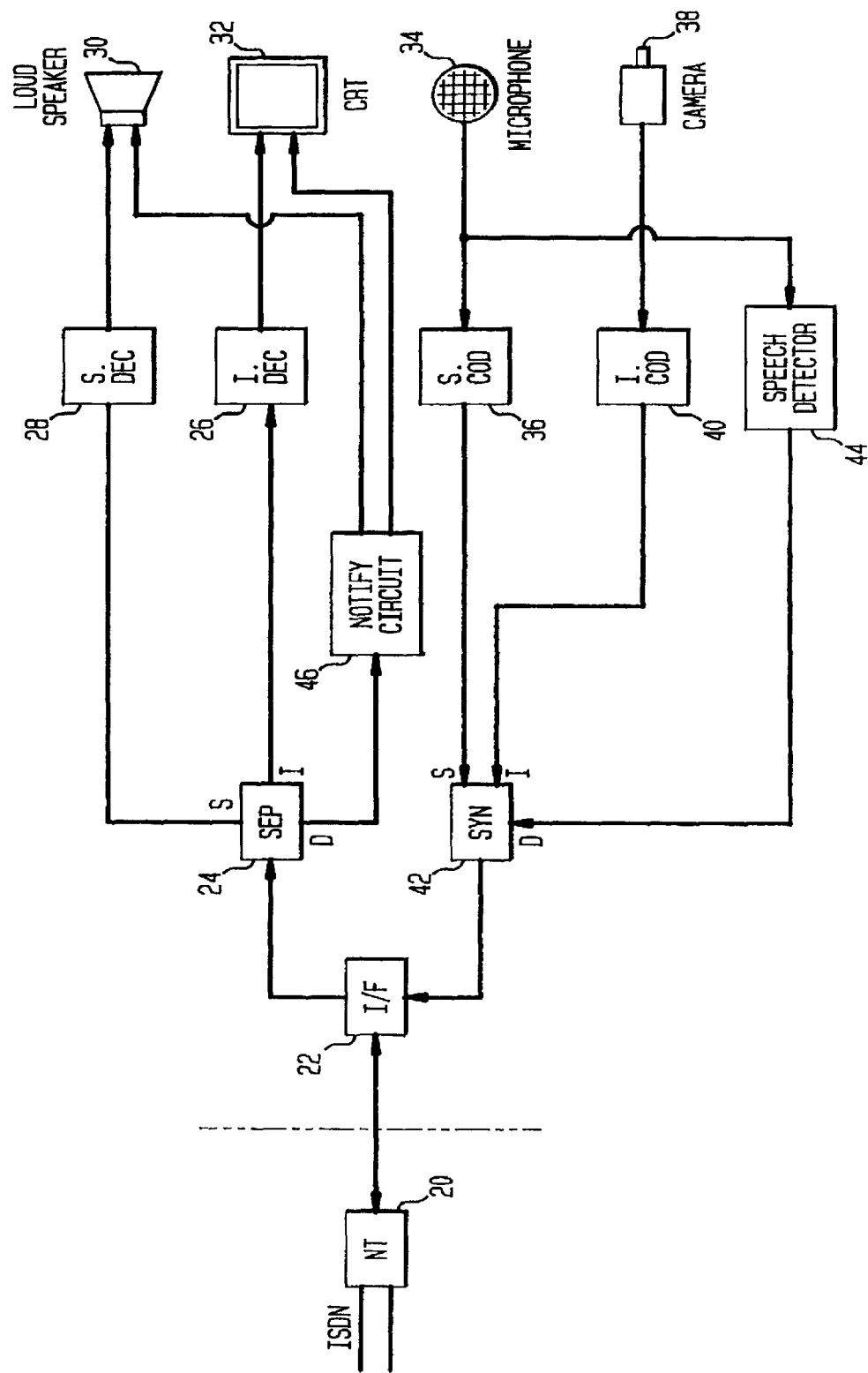
FIG. 2 is a block diagram depicting of a video conferencing system constructed in accordance with an illustrative embodiment of the present invention.

Referring now to the drawings, wherein like reference numerals designate identical or corresponding elements throughout the several views, and more particularly to FIG. 2 thereof, a first embodiment of the inventive apparatus will initially be described.

FIG. 2 is a block diagram of a video conferencing apparatus constructed in accordance with an illustrative embodiment of the present invention. The apparatus utilizes many of the components of a conventional video conferencing arrangement, such as the apparatus 10 of FIG. 1. In FIG. 2, a line interface 22 is connected to a line terminal circuit 20 of an ISDN (integrated services digital network) in a bus fashion.

Illustratively, image signals and sound signals are multiplexed in a range of 64 kbps×n (e.g., an image signal of 48 kbps+a sound signal of 16 kbps, or an image signal of 100 kbps+a sound signal of 100 kbps+a sound signal of 28 kbps, etc.). Separation circuit 24 separates the multiplexed signals into image signals I and sound signals S. Thus, if a call is received from the user A of FIG. 1, a multiplexed signal of image and sound is fed to separation circuit 24 through interface 22.

As noted, separation circuit 24 separates the received multiplexed signal into an image signal I and an audio signal S. The thus separated image signal I is fed to an image signal decoding circuit 26, and the separated audio signal S is fed to an audio signal decoding circuit 28. Audio signal decoding circuit 28 is connected to a loudspeaker 30 so as to reproduce the sound of user A. Image signal decoding circuit 26 is connected to a CRT-type or other monitor 32 so as to reproduce the transmitted image of the user A. Further, the voice of user B is converted by a microphone 34 into an audio signal which is, in turn, fed to an audio coding circuit 36. The image of the user B is converted by a video camera 38 into an image signal which is, in turn, fed to an image coding circuit 40. The coded audio signal and the coded image signal are respectively produced from the circuits 36, 40 and fed to a synthesizer circuit 42 so as to be multiplexed therein. In accordance with an appropriate delay insertion algorithm, synthesizer circuit 42 utilizes conventional buffers and other signal processing elements (not shown) to facilitate introduction of delay into the audio signal path relative to the corresponding video signal prior to multiplexing of the two signals. The resulting synthesized signal is fed through interface 22 to the line terminal circuit 20. Audio-visual communication between the users A and B can thus be carried out with the video conferencing apparatus depicted in FIG. 2.

Figure 1:
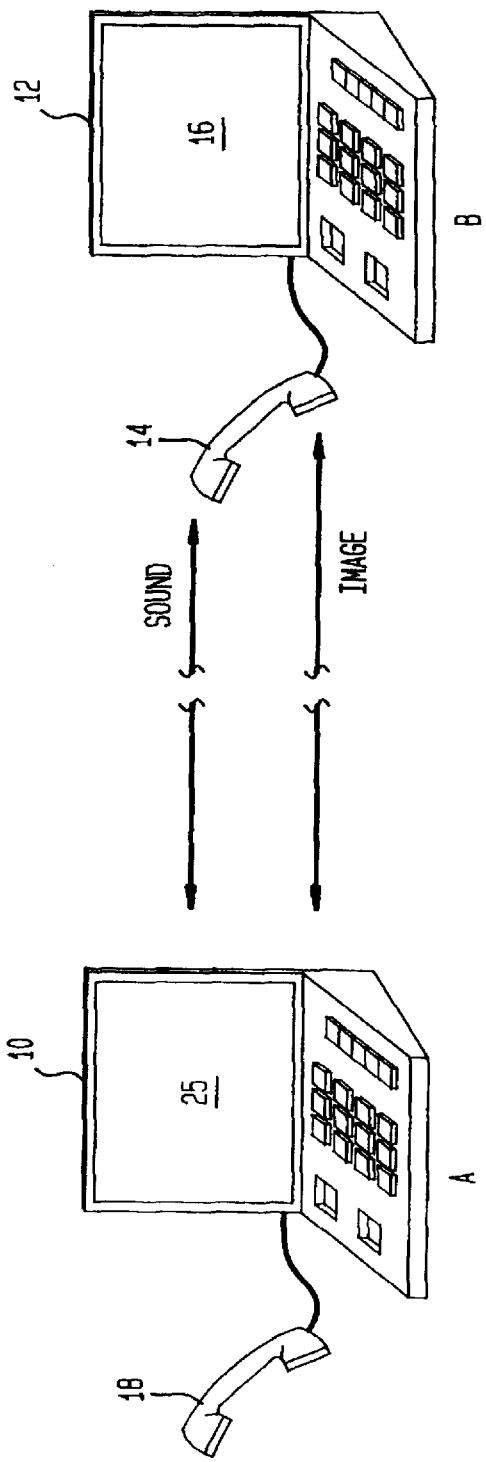
FIG. 1 illustrates the basic components of a conventional video conferencing system.

Regardless of the respective coding algorithms employed, the processing delay associated with coding and decoding of the audio signal in a video conferencing system such as the system 10 of FIG. 1 is usually substantially less than the delay associated with coding and decoding of the corresponding video signal. In accordance with the illustrative embodiment of the present invention depicted in FIG. 2, lip synchronization is restored in a conventional manner by inserting additional delay into the audio transmission path. As indicated above, however, such synchronization does not always provide optimum performance. For example, during operation in a two-way interactive mode in which two speakers such as A and B are engaging in a dialogue, the speakers may begin speaking simultaneously and not learn of the other's action until the passage of the transmission delay interval. Matters may be even further complicated in situations where three or more speakers are participating in an interactive conversation. As will now be described in detail, such situations may be avoided in accordance with the teachings of the present invention.

In the illustrative embodiment of the present invention depicted in FIG. 2, other users are provided with an immediate indication when a first user begins to speak. For this purpose, a speech detector circuit 44 may be deployed at all stations or locations at which audio signals originate. Essentially, speech detector circuit 44 detects when a speaker (i.e. user B in the present example) has begun to speak and outputs a speech detected signal D to synthesizer circuit 42 for inclusion in the multiplexed signal(s) transmitted to other location(s). In order to provide immediate notification to other users such, for example, as user A, signal D is transmitted with minimal delay and thus arrives at a destination video conferencing apparatus before the actual, predeterminately delayed utterance of user B is heard by user A.

Should the multiplexed signal received from user A by separator circuit 24 of user B include a signal component D (indicating that the remote user A has begun to speak), the separated signal D may be utilized to provide a brief indication to user B that someone else has already begun speaking. This indication may be audible, visual, or some combination thereof sufficient to gain the attention of user B. Illustratively, signal D may be utilized to illuminate a small indicating lamp for a predetermined interval and/or to briefly activate a piezoelectric buzzer device (neither of which are shown).

In the embodiment depicted in FIG. 2, the signal D is received by a notification circuit 46. In response to the receipt of signal D, notification circuit 46 addresses the display 32 and causes an on-screen visual indication to be briefly displayed thereon. Notification circuit 46 also outputs an accompanying audio signal to loudspeaker 30. If desired, a suitable selector switch (not shown) may be included to manually enable/disable the signal D detecting circuit. Such a switch might, for example, be employed when operating in the "lecture" mode in which all audio signals originate from a single source during a communication session.

The system of FIG. 2 may be used to provide interactive, multipoint video conferencing while avoiding the problems of simultaneous speech and disruptive start-stop communication. When simultaneous speech is detected, for example, permission can be granted to one speaker based on a fairness (or rank) criterion. Other speakers will see and/or hear a stop-speaking signal. A queue of persons desiring to speak may be maintained in order to preserve fair access, and the display presented to the current speaker may include a list of those persons waiting to speak.

On heavily loaded packet networks that support priorities, the speech detection may be carried out at each terminal and signalled via multicast at high priority to all other user terminals. Permission to speak may then be awarded or requested by common software running on each terminal. In any event, it will be readily appreciated by those skilled in the art that a variety of adaptations and modifications may be employed utilizing the teachings of the present invention.

Figure 3:
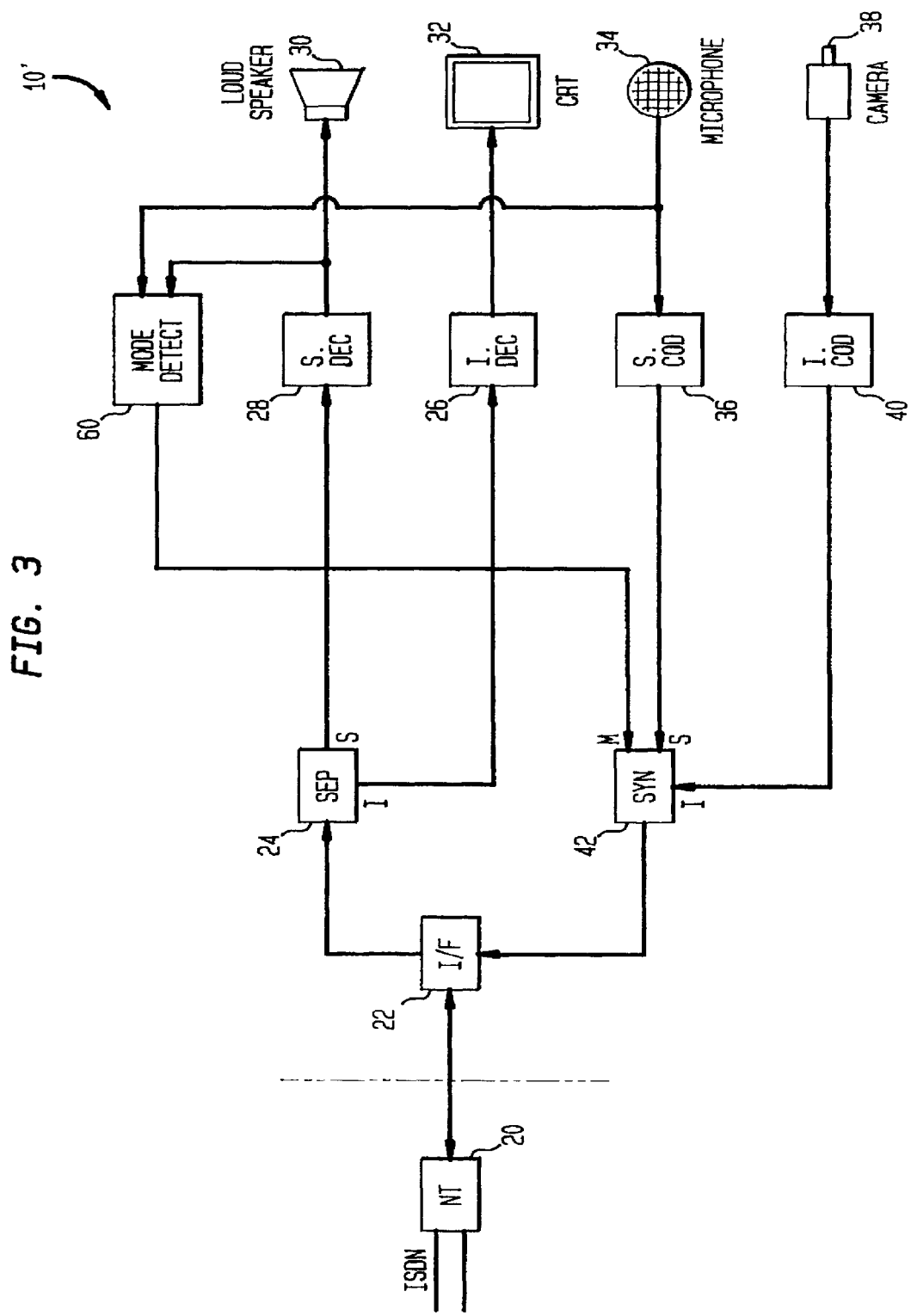
FIG. 3 is a block diagram depicting of a video conferencing system constructed in accordance with an alternate embodiment of the invention.

As previously discussed, lip synchronization is desirable when only one user is speaking but may be annoying and disruptive when two or more speakers are engaged in an interactive dialogue. In accordance with an alternate embodiment of the present invention, audio signal processing is utilized to distinguish between a mode characterized by highly interactive communication and a lecture or "monologue" mode. Delays sufficient to achieve lip synchronization are selectively inserted into the audio transmission path only when such synchronization is desirable (i.e. primarily during the lecture mode). Thus, and with reference now to FIG. 3, it will be observed that the video system 10' includes a mode detection circuit 60 for monitoring the audio signals originating locally at one or more remote locations and for assessing the degree of interactivity as between the speakers or conference participants. By way of example, mode detection circuit 60 may assess interactivity by measuring the amount of time elapsing between transmitted and received utterances.

Illustratively, mode detect circuit 60 outputs, at predetermined intervals, a mode control signal M to synthesizer circuit 42. If desired, synthesizer circuit 42 may simply be configured to recognize, from mode control signal M, whether or not lip synchronization is required. Thus, for example, if mode detection circuit 60 detects a low level of interactivity suggesting operation in the lecture mode, signal M will supply this information to synthesizer circuit 42 which, in turn, will insert the predetermined amount of transmission delay necessary to achieve lip synchronization during synthesis of the image and audio signals. Conversely, if a high degree of interactivity is detected by mode detection circuit 60, synthesis circuit 42 may be configured to respond by reducing the amount of delay inserted. Thus, in accordance with the present invention, the delay of audio may be reduced during highly interactive conversations to facilitate spontaneity at the expense of audio-video synchronization. It is expected that removal of lip-synchronization during this presumably short period of time will be subjectively more desirable to the communicating participants than enduring frequent disruptions. Of course, if at a later time the conversation shifted to longer monologues or to a lecture, lengthier delays can be restored to re-establish lip-synchronization. If desired, the change or variation in the amount of delay may be implemented gradually by shortening or lengthening pauses in a user's speech.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. For example, although each of the above illustrative embodiments of the present invention has been described in connection with two distinct implementations, it is possible to utilize the novel features of both in a single video conferencing. For example, a suitable selector switch or software command might be included to enable the user to selectively choose between operation in accordance with either of the abovedescribed embodiments. Moreover, if lip synchronization is inserted into the audio signal at the receiver end, rather than at the transmitting end, the speech detection circuit may be configured to recognize the arrival of an utterance and to directly provide a visual or audible indication based upon this information. In such a modified embodiment, it would not be necessary to generate and process a separate speech detected signal.

It is the intention, therefore, to be limited only as indicated by the scope of the claims appended hereto.

What is claimed is:

1. A communication system, comprising:
   a plurality of video conferencing apparatuses each including
      a display device for displaying an image of at least one communicating party;
      speech communicating means for reproducing utterances made by said communicating party; and
      video communicating means for reproducing images of said communicating party;
   at least a first of said plurality of video conferencing apparatuses including
      video input means for receiving video information from said communicating party using said first video conferencing apparatus and for generating a video signal indicative of said image of said communicating party;
      speech detecting means for detecting one of said utterances of said communicating party using said first video conferencing apparatus and for generating a speech detected signal in response thereto;
      means for transmitting said utterances for reproduction and said video signal to a second of said plurality of video conferencing apparatuses; and
      means for transmitting said speech detected signal to said second of said plurality of video conferencing apparatuses for processing of said transmitted speech detected signal by said second of said plurality of video conferencing apparatuses prior to reproduction of said transmitted utterances and transmitted images for alerting a user of said second of said plurality of video conferencing apparatuses that said communicating party is speaking, said second of said plurality of video conferencing apparatuses including
      indicator means responsive to receipt of said speech detected signal for providing an indication to said user of said second video conferencing apparatus, prior to reproduction, by said video communicating means of said second conferencing apparatus, of the images of said communicating party.

2. The communication system according to claim 1, wherein said indicator means is operable to address the display device of said second video conferencing apparatus to thereby display on said display device an indication that a remote user has begun to speak.

3. The communication system according to claim 1, wherein said indicator means comprises an indicator lamp.

4. The communication system according to claim 1, further comprising means for disabling operation of said indicator means.

5. A communication system, comprising:
   a plurality of video conferencing apparatuses each including
      a display device for displaying an image of at least one communicating party;
      speech communicating means for reproducing utterances made by said communicating party; and
      video communicating means for reproducing images of said communicating party;
   each of said plurality of video conferencing apparatuses including
      video input means for receiving video information from said communicating party using one of said plurality of video conferencing apparatuses and for generating a video signal indicative of said image of said communicating party;
      speech detecting means for detecting an utterance by said communicating party using said one of said plurality of video conferencing apparatuses and for generating a speech detected signal in response thereto;
      means for transmitting said detected utterances and said video signal to at least another of said plurality of video conferencing apparatuses; and
      indicator means responsive to said speech detected signal from another of said plurality of video conferencing apparatuses for providing at least one of a visual and an audible indication prior to reproduction of images of said communicating party.

6. The system according to claim 5, wherein said indicator means is operable to address the display device of said at least another video conferencing apparatus to thereby display on said display device an indication that a remote user has begun to speak.

7. A communication system, comprising:
   a plurality of video conferencing apparatuses each including
      a display device for displaying an image of at least one communicating party; and
      speech communicating means for reproducing utterances made by said communicating party;
   each of said plurality of video conferencing apparatuses being operable in a lecture mode in which audio signals indicative of utterances of at least one user are received from at least one video conferencing apparatus, and in an interactive mode in which audio signals indicative of utterances of a plurality of users are exchanged between a plurality of said video conferencing apparatuses; and audio signal processing means for determining, over predetermined intervals, whether at least two of said plurality of video conferencing apparatuses are being operated in said interactive mode or said lecture mode; each of said plurality of video conferencing apparatuses further including synchronizing means responsive to said processing means for selectively delaying transmission of said audio signals relative to corresponding transmitted image signals so as to achieve synchronization of said audio and image signals during operation of at least one receiving video conferencing apparatus in said lecture mode, said synchronizing means being further operable to minimize audio signal transmission delays relative to corresponding transmitted image signals during operation of a receiving video conferencing apparatus in said interactive mode.

8. A method of operating a video conferencing system having a plurality of video conferencing apparatuses each including a display device for displaying images of at least one communicating party, speech communicating means for communicating to said plurality of video conferencing apparatus an utterance by said at least one communicating party and for generating a speech detected signal in response thereto, and video input means for receiving video information from said at least one communicating party and generating a video signal for receipt by at least one video conferencing apparatus for reproduction of said video information, comprising the steps of:

detecting an utterance by a user of a first video conferencing apparatus; and providing, in response to detection of an utterance in said detecting step, at least one of a visual and an audible warning to a second user of a second video conferencing apparatus, prior to reproduction of said video information received by said second video conferencing apparatus.

9. The method according to claim 8, wherein said detecting step is performed by a speech detecting means of the first video conferencing apparatus.

10. The method according to claim 9, further comprising a step of transmitting a signal indicative of a detected utterance to the second video conferencing apparatus.

11. The method according to claim 8, wherein said providing step includes displaying a visual warning on the display device of the second video conferencing apparatus.

12. A method of operating a video conferencing system having a plurality of video conferencing apparatuses each including a display device for displaying images of at least one communicating party and speech communicating means for communicating with said at least one communicating party an utterance by a user of one of the plurality of video conferencing apparatuses, each of the plurality of video conferencing apparatuses being operable in a lecture mode in which audio signals indicative of utterances of at least one user are received from at least one of said plurality of video conferencing apparatuses, and in an interactive mode in which audio signals indicative of utterances of a plurality of users are exchanged between a plurality of the video conferencing apparatuses, comprising the steps of:

determining, over predetermined intervals, whether at least two of the video conferencing apparatuses are being operated in the interactive mode or the lecture mode; and selectively delaying at least one audio signal relative to a corresponding image signal to achieve substantially synchronized reproduction and display of said audio and image signals during operation of at least one receiving video conferencing apparatus in the lecture mode, said selectively delaying step further comprising minimizing audio signal delays relative to corresponding image signals when operation of a receiving video conferencing apparatus in the interactive mode is detected during said determining step.

13. The method according to claim 12, wherein said selectively delaying step comprises delaying the transmission of at least one audio signal relative to the transmission of a corresponding transmitted image signal.

* * * * *